US006526664B2

United States Patent
Cech

(10) Patent No.: US 6,526,664 B2
(45) Date of Patent: Mar. 4, 2003

(54) LOW PROFILE PRUNING TOOL

(75) Inventor: Michael J. Cech, Madison, WI (US)

(73) Assignee: Aquapore Moisture Systems, Phoenix, AZ (US)

( * ) Notice: Subject to any disclaimer, the term of this patent is extended or adjusted under 35 U.S.C. 154(b) by 0 days.

(21) Appl. No.: 09/850,705

(22) Filed: May 7, 2001

(65) Prior Publication Data

US 2002/0162227 A1 Nov. 7, 2002

(51) Int. Cl.[7] .............................................. B26B 13/26
(52) U.S. Cl. .......................................... 30/249; 30/245
(58) Field of Search ........................ 30/249, 245, 246, 30/296.1, 231

(56) References Cited

U.S. PATENT DOCUMENTS

| | | | |
|---|---|---|---|
| 102,752 A | 5/1870 | Bigelow | |
| 111,106 A | 1/1871 | Calder | |
| 247,128 A | 9/1881 | Stanley | |
| 425,820 A | 4/1890 | Nelson | |
| 1,135,989 A | 4/1915 | Breach | |
| 1,507,225 A | 9/1924 | Barrett | |
| 2,246,730 A | 6/1941 | Hafdell | 30/251 |
| 2,259,642 A * | 10/1941 | Hoyt | 30/249 |
| 2,569,888 A | 10/1951 | Gustafson | 30/249 |
| 2,744,322 A | 5/1956 | Gustafson | 30/249 |
| 3,360,858 A * | 1/1968 | Cowley | 30/249 |
| 3,835,535 A | 9/1974 | Robison et al. | 30/249 |
| 4,420,883 A | 12/1983 | Wallace et al. | 30/251 |
| 4,649,646 A | 3/1987 | Lemcke | 30/231 |
| 4,760,645 A | 8/1988 | Davis | 30/249 |
| 5,020,222 A | 6/1991 | Gosselin et al. | 30/251 |
| 5,084,975 A | 2/1992 | Melter | 30/249 |
| 5,241,752 A | 9/1993 | Lutzke et al. | 30/249 |
| 5,634,276 A * | 6/1997 | Lin | 30/249 |
| 5,745,998 A | 5/1998 | Le et al. | 30/249 |
| 5,933,965 A | 8/1999 | Lindén et al. | 30/249 |
| 5,950,315 A | 9/1999 | Lindén | 30/249 |
| 6,038,773 A | 3/2000 | Le et al. | 30/249 |
| 6,178,644 B1 | 1/2001 | Le et al. | 30/249 |

* cited by examiner

*Primary Examiner*—Hwei-Slu Payer
(74) *Attorney, Agent, or Firm*—Foley & Lardner

(57) ABSTRACT

A low profile tree pruning tool is provided having a head assembly coupled to an upper region of an elongated handle member and a pulley coupled to the head where the pulley is configured to rotate about a fixed axis. A lopping mechanism is coupled to the head and an actuating line couples the lopping mechanism to the pulley. A transfer line couples the pulley to a slide block and a stationary block is rigidly coupled to the handle member below the head. A tension line has a first end coupled to the slide block and is configured to movably engage the stationary and slide blocks.

24 Claims, 3 Drawing Sheets

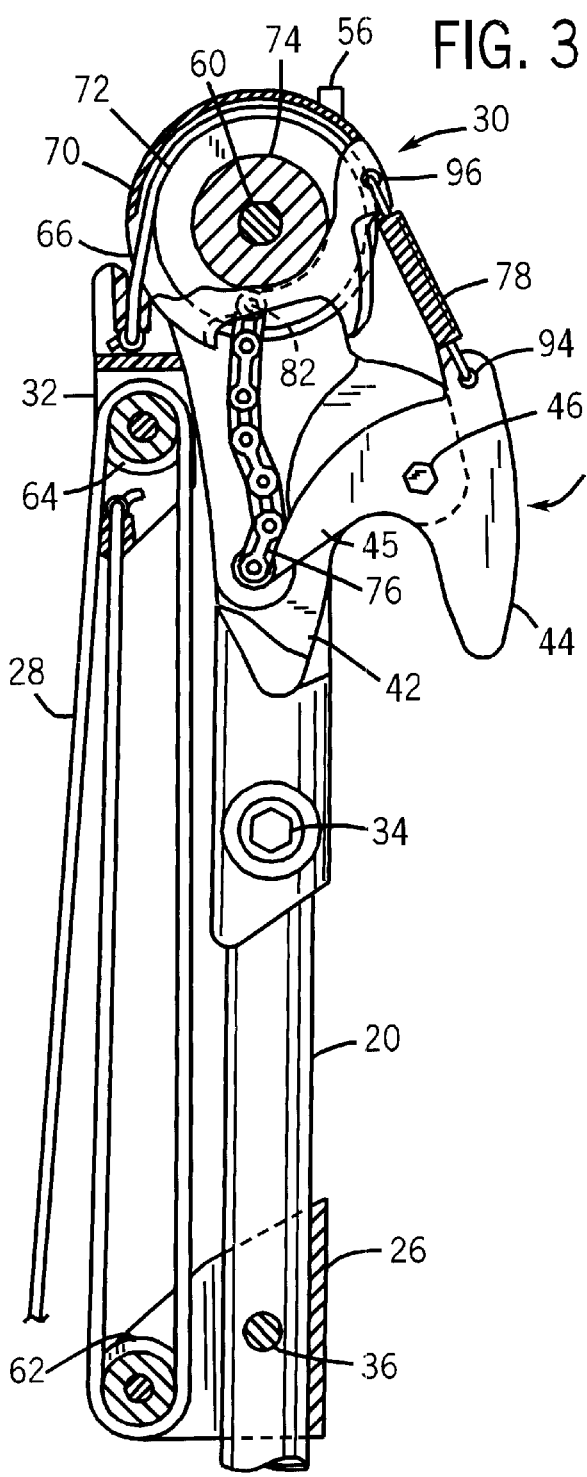
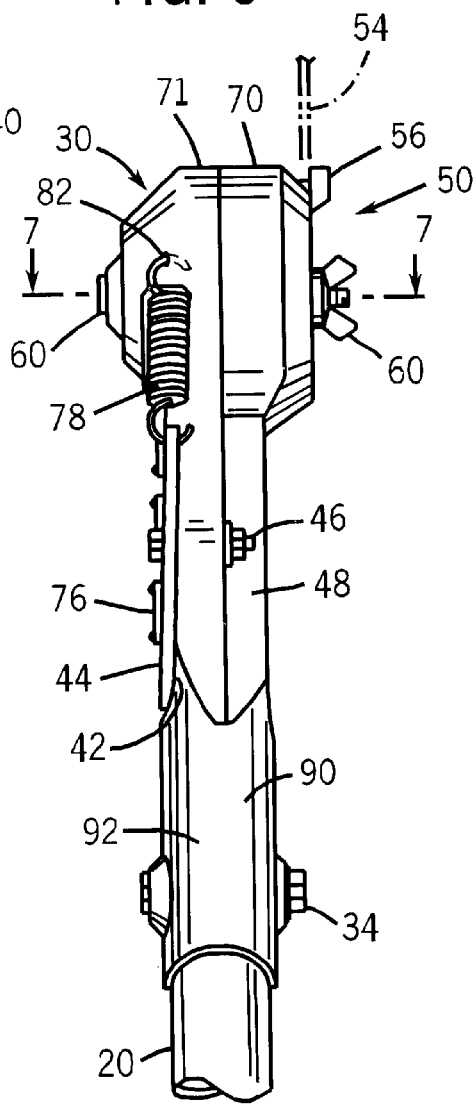

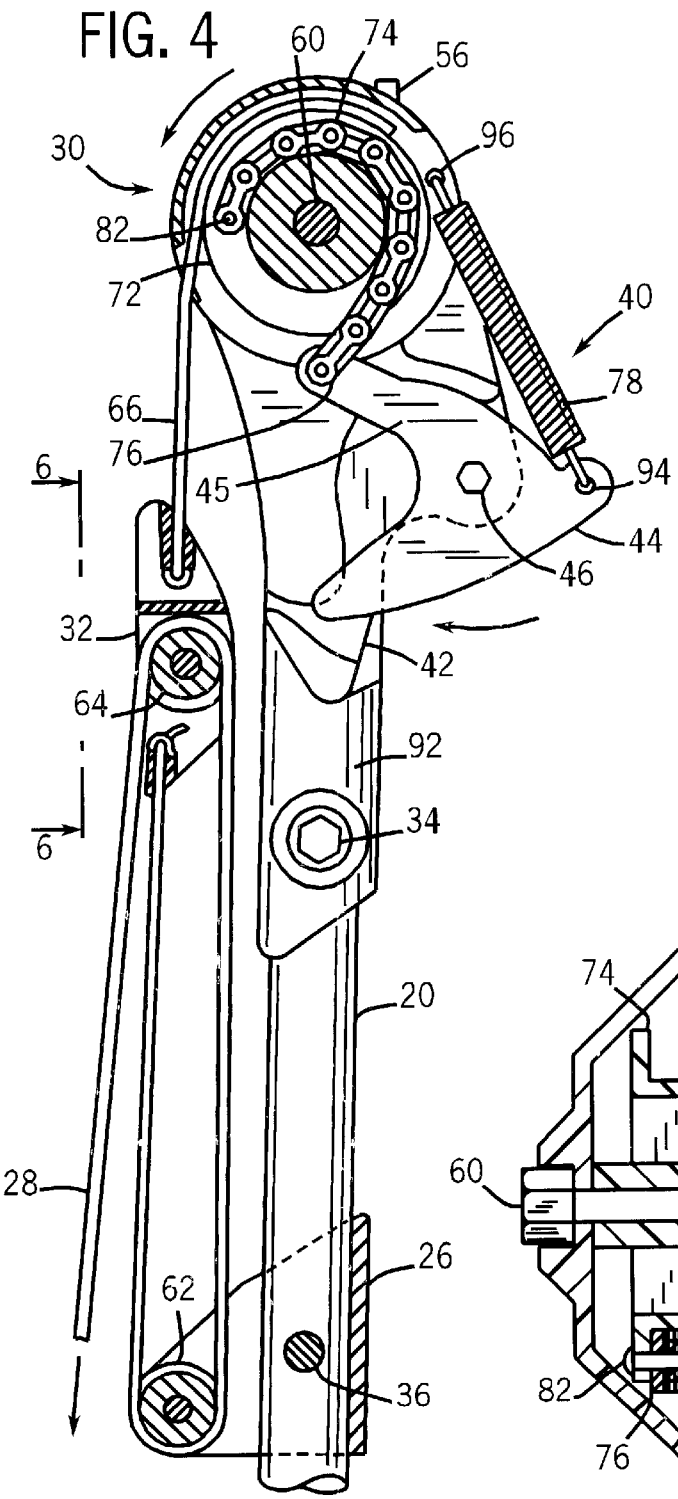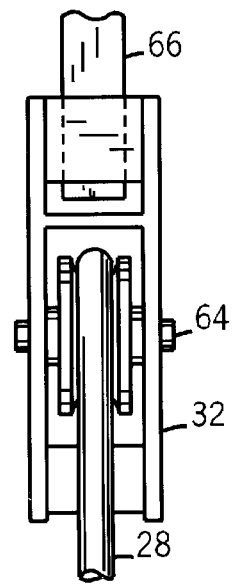

LOW PROFILE PRUNING TOOL

FIELD OF THE INVENTION

The present invention relates generally to the field of pruning tools.

BACKGROUND OF THE INVENTION

Pole-mounted pruning tools are widely used by arborists and others to control foliage growth at substantial heights. Conventional pruning tools usually comprise an elongated shaft or tube on the upper end of which a head is mounted. The head often includes a lopping mechanism in the form of an outwardly projecting hook-shaped stationary jaw and a pivotal blade. The blade is typically biased in an open position by a spring and usually includes an actuating device near a lower end of the elongated shaft to enable a user to remotely actuate the lopping mechanism of the tool in a lopping mode at substantial distances that are otherwise ordinarily beyond the user's direct reach. Pruners may also have a cutting device similar to a saw blade also mounted to an upper end of the head portion of the pruner. A user may also operate the tool in a sawing mode whereby the tool is moved in a reciprocating manner to effect a sawing operation.

Typical pruning tools are often configured with a head portion having an outwardly extending lever arm or similar structure that provides mechanical advantage for rotating the pivotal blade outwardly to engage the stationary jaw in a closed position as shown by example in U.S. Pat. Nos. 5,613,301 and 5,996,232. These pruning tools have the disadvantage of being susceptible to becoming entangled in, or obstructed by, surrounding foliage when used in either the lopping or sawing modes due to the awkwardness of the outwardly extending structure. Accordingly, it would be desirable to provide a pruning tool having a streamlined head profile that can be easily maneuvered in dense foliage. It would also be desirable to provide such a low profile pruning tool having sufficient mechanical advantage to provide effective cutting capability. It is further desirable to provide a low profile pruning tool having a cutting blade that rotates inwardly to reduce interference with, and damage to, surrounding foliage when used in dense areas.

Accordingly, it would be desirable to provide a low profile pruning tool having one or more of these advantageous features.

SUMMARY OF THE INVENTION

One embodiment of the invention relates to a low profile tree pruning tool having a head assembly coupled to an upper region of an elongated member and a drive mechanism coupled to the head assembly where the pulley is configured to rotate about a fixed axis. A lopping mechanism is coupled to the head assembly and an actuating line couples the lopping mechanism to the drive mechanism. A transfer line couples the pulley to a slide block. A stationary block is rigidly coupled to the elongated member below the head assembly. A tension line has a first end coupled to the slide block and is configured to movably engage the stationary and slide blocks.

BRIEF DESCRIPTION OF THE DRAWINGS

FIG. 3 is a side elevation view of an upper region of the low profile pruning tool in a released position.

FIG. 4 is a side elevation of an upper region of the low profile pruning tool in an actuated position.

FIG. 5 is a front elevation view of an upper region of the low profile pruning tool.

FIG. 6 is a rear elevation view of the slide block taken generally along lines 6—6 of FIG. 4.

FIG. 7 is a cross sectional view of the drive mechanism taken generally along lines 7—7 of FIG. 5.

DETAILED DESCRIPTION OF THE PREFERRED EMBODIMENTS

Figure 1:
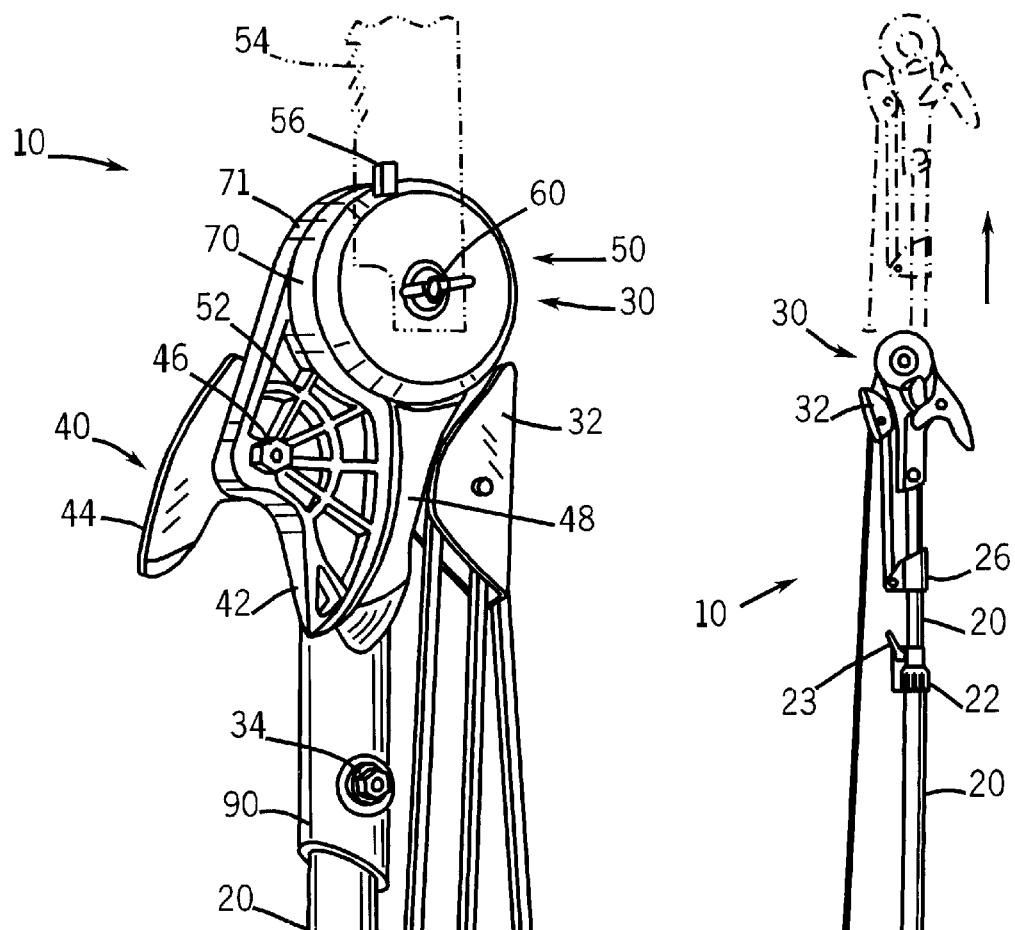
FIG. 1 is a side elevation view of a low profile pruning tool.
Figure 2:
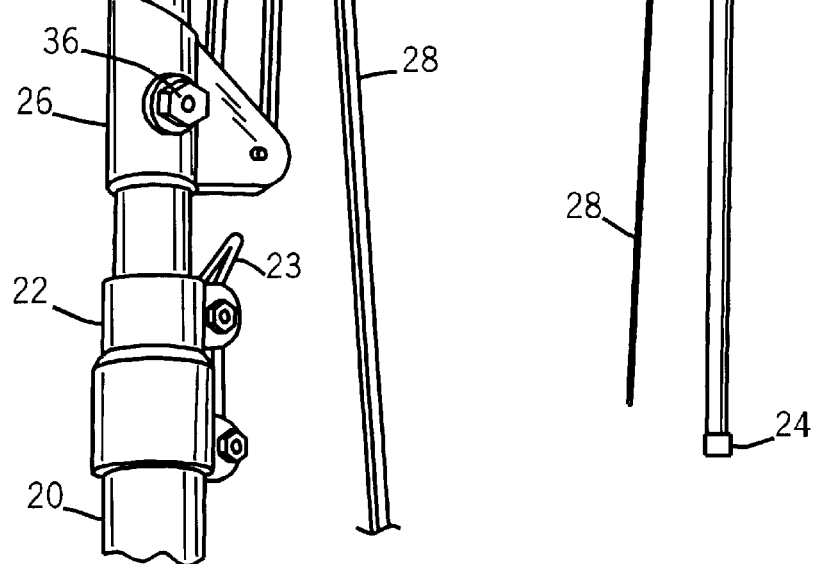
FIG. 2 is a perspective view of an upper region of the low profile pruning tool.

Referring to FIGS. 1 and 2, a pruning tool 10 is shown according to a preferred embodiment of the present invention. Pruning tool 10 provides a tool for pruning, trimming, cutting, lopping, etc. a wide variety of vegetation including plants, trees, shrubs, branches, limbs, foliage, etc. (not shown) that enables a user to remotely prune vegetation that may not otherwise be within reach.

Pruning tool 10 includes one or more elongated members 20 in the form of shafts, poles, handles, etc. that may be used singularly (not shown) or configured for coaxially telescoping extension with one or more retainers 22 in the form of a clamp or holder for adjustably securing the elongated members to the height desired for pruning tool 10. Retainer 22 may be provided with a quick-release latch 23 (shown as a lever) for clamping and releasing a first elongated member 20 to a second elongated member 20 by moving latch 23 between a locked position and an unlocked position. Head assembly 30 is mounted to an upper region of an upper most elongated member 20. Head assembly 30 is shown attached to elongated member 20 by a threaded fastener 34 but may be attached by any suitable means including press-fit, threaded engagement, adhesive, rivets, pins, etc. Stationary block 26 is mounted to upper most elongated member 20 at a sufficient distance below head assembly 30 to permit free operation of sliding block 32. Stationary block 26 is shown attached to elongated member 20 by a threaded fastener 36 but may be attached by any suitable means including press-fit, adhesive, rivets, pins, etc. Tension line 28 has a first end attached to sliding block 32 and a second end routed to a convenient actuating location near end cap 24 located at the bottom of the lower most elongated member 20. Alternatively, the second end of tension member 28 may be attached to a slidable sleeve (not shown) on the elongated member or the second end of tension member 28 may be attached to end cap 24.

Referring to FIG. 2, head assembly 30 is shown according to a preferred embodiment. Head 30 includes a lopping mechanism 40 in the form of cutting jaws having a stationary jaw and a pivoting jaw. Head 30 may be unitarily formed with a stationary hook portion 42 portion having an upward curvature to form the stationary jaw portion of the lopping mechanism 40. Head 30 includes a rotatable pivoting blade 44 that has a curved jaw portion and a lever portion 45 and operates in cooperation with hook portion 42 in a shearing relationship where blade 44 passes beyond the cutting surface of hook 42 to lop-off foliage captured between hook portion 42 and the jaw portion of blade 44 when lopping mechanism 40 is actuated. Pivoting blade 44 may also be removably attached to head 30 to facilitate replacement after suitable wear. Hook portion 42 and blade 44 are configured as a pair of downwardly extending jaws, whereby the open jaws of the pruning tool 10 may be placed over, and then lowered onto, a branch, limb, stem, etc. so that the foliage to be lopped provides support to pruning tool 10 during the lopping operation. Blade 44 is shown pivotally attached to head 30 by threaded fastener 46 but may be pivotally coupled by any suitable means including pins, bushings, bearings, etc. In an alternative embodiment, hook portion 42 may be in the form of an anvil (not shown) where hook portion 42 and blade 44 cooperate in a clamping operation where hook 42 and blade 44 contact each other in an abutting relationship.

Saw blade 54 may be removably attached to head 30 by a guide tab 56 on head 30 corresponding to mating aperture (not shown) on saw blade 54 and retained by threaded fastener 60 shown as a through-bolt and wing nut. Alternatively, saw blade 54 may be permanently mounted to head 30 or removably attached to head 30 by any suitable means to ensure stable operation when used in the sawing mode.

Referring further to FIGS. 2 and 5, head 30 includes a housing having two mating housing half portions 70 and 71. Housing portion 70 is integrally formed with a support portion 48 that is coupled to, and supports, a drive mechanism 50 in the form of a pulley assembly, and a semi-circular sleeve 90 that is adapted to fit over member 20. Housing portion 71 is integrally formed with a hook portion 42 and a semi-circular sleeve 92 that is adapted to fit over member 20 and adjoin sleeve 90 to form a tight seam. Housing portion 71 may also include stiffening webs 52 to maintain sufficient structural rigidity while minimizing overall weight of head 30. In a particularly preferred embodiment, housing portion 70 is made of "NYLON" and formed by an injection molding process, but may be composed of any other suitable plastic or polymer that is lightweight, strong and rigid. Housing portion 71 is made of zinc and formed in a die cast process, but may be steel or aluminum or any other suitable material having the necessary strength and toughness for pruning service.

Referring to FIGS. 3 and 4, the actuating components of head 30 are shown according to a preferred embodiment. Slide block 32 increases the mechanical advantage of a user pulling on tension line 28 by having three interfaces. The first interface on slide block 32 is a fixed connection to transfer line 66. The second interface on slide block 32 is a fixed connection to a first end of tension line 28. The third interface on slide block 32 is a pulley 64 that receives tension line 28 after tension line 28 is routed from the second interface and through a pulley 62 on stationary block 26. Slide block 32 and stationary block 26 are preferably made of NYLON or plastic, but may be made of any material suitable for transferring the tensile loading on tension line 28 to transfer line 66.

At the first interface, tension line 28 is fixed using any suitable means shown schematically as a knot or crimped plug (not shown) at a first end to slide block 32. Tension line 28 is then routed downward to stationary block 26 and through rotatable pulley 62 where the tension line's 28 direction of force is reversed. Tension line 28 is then routed upward to slide block 32 and through the rotatable pulley 64 where the tension line's direction of force is again reversed. The second end of tension line 28 is routed downward where it is accessible for user-actuation by pulling downward. The second end of Tension line 28 may be left unattached for increased flexibility or the second end may be attached to the bottom end, or any lower portion, of the lower most elongated member 20 where it may be conveniently grasped and pulled by a user. Pulleys 62 and 64 increase the mechanical advantage of the user when pulling the second end of tension line 28 in a generally downward direction (i.e. relative to head 30 and along the axis of elongated member 20) to move slide block 32 in a similar downward direction. Single pulleys are shown on stationary block 26 and slide block 32 however multiple pulleys (not shown) may be provided to increase the available mechanical advantage.

Referring to FIGS. 5 and 7, drive mechanism 50 is partially enclosed within housing portions 70 and 71 and includes a double pulley having a transfer sheave 72 and an actuating sheave 74, each in the form of a pulley or grooved wheel, that are rotationally coupled for pivoting movement about an axis defined by through-bolt 60. Housing portions 70 and 71 include openings for travel of actuating line 76 and transfer line 66 during pulley rotation, yet provides sufficient enclosure to minimize intrusion of foreign materials during operation such as dirt and foliage. Transfer sheave 72 has a larger diameter than actuating sheave 74, thus providing increased mechanical advantage to the user for actuating lopping mechanism 40. Preferably the ratio of transfer sheave 72 diameter to actuating sheave 74 diameter is approximately 1.23 inches to 0.64 inches, however other ratios may be used to acquire the desired mechanical advantage depending on the overall size of head 30 and the number of pulleys provided on stationary block 26 and slide block 32. Actuating sheave 74 may be oriented eccentrically (not shown) relative to transfer sheave 72 to provide a cam-like motion producing a varying degree of rotational mechanical advantage throughout the rotational range of sheaves 72 and 74.

Transfer line 66 has a first end attached in a non-slip manner such as a knot or a crimped plug (not shown) to transfer sheave 72 so that a portion of transfer line 66 is wound along a portion of the circumference of sheave 72. A second end of transfer line 66 is attached in a non-slip manner, shown schematically as a knot but may be a crimped plug (not shown) or other suitable retainer, to an upper portion of slide block 32 as shown in FIGS. 4 and 6. A downward motion imposed on slide block 32 by pulling downward on tension line 28 will partially unwind transfer line 66 from sheave 72, thereby imparting a anti-clockwise rotation on sheaves 72 and 74 as shown in FIG. 4. An actuating line 76 has a first end attached in a non-slip manner shown schematically as a pin 82 to actuating sheave 74 so that a portion of actuating line 76 is wound along a portion of the circumference of sheave 74. A second end of actuating line 76 is attached to a lever portion 45 of blade 44, whereby anti-clockwise rotation of sheaves 72 and 74 will further wind actuating line 76 on actuating sheave 74, thereby pivoting blade 44 inwardly toward hook portion 42 about the axis of connector 46 to actuate lopping mechanism 40.

Referring further to FIGS. 3 and 4, lever portion 45 of blade 44 is biased toward an open position by a spring 78 that has a first end coupled to blade 44 and a second end attached to housing portion 71. Spring 78 is preferably an extension-type coil spring having hooks at each end for attachment through retainer aperture 94 in blade 44 and retainer aperture 96 in housing portion 71. Alternatively, a torsion spring or leaf spring (not shown) may be used to return blade 44 to an open position or an extension spring may be fastened between a lower end of the lever portion 45 of blade 44 and a lower portion of head 30.

Sheaves 72 and 74 are integrally formed in a preferred embodiment but may be separately produced and linked in any suitable manner for unitary rotation. Sheaves 72 and 74 are preferably made of an acetal plastic in an injection molding process, but may be made of any material suitable for supporting and transferring the actuating force from a user applying a downward force to transfer line 28 to lopping mechanism 40. Sheaves 72 and 74 may include a bearing or bushing (not shown) to reduce operational friction of pruning tool 10. Actuating member 76 is shown as a chain attached to sheave 74 by a link or pin 82 but may be a cable, cord, wire, rope, strap, etc. Transfer member 66 is shown as a strap having a flattened rectangular cross section and is preferably made of polyester, but may have any suitable shape and be of any appropriate material for transferring the user input force to actuating line 76. Tension member 28 is shown as a rope or cord and is preferably made of polypropylene, but may be made of any suitable material for repeated use in transferring a user input force to slide block 32.

It is also important to note that the construction and arrangement of the elements of the pruning tool as shown in the preferred and other exemplary embodiments is illustrative only. Although only a few embodiments of the present inventions have been described in detail in this disclosure, those skilled in the art who review this disclosure will readily appreciate that many modifications are possible (e.g. variations in sizes, dimensions, structures, shapes and proportions of the various elements, mounting arrangements, use of materials, colors, orientations, etc.) without materially departing from the novel teachings and advantages of the subject matter recited in the claims. For example, multiple pulleys may be used in the sliding and stationary blocks to further increase the available mechanical advantage for a user. Further, sprockets may be substituted for the sheaves to engage corresponding chain links on the actuating and transfer lines. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions as expressed in the appended claims.

What is claimed is:

1. A low profile pruning tool comprising:
   one or more elongated members;
   a head assembly coupled to an upper region of the elongated member;
   a drive mechanism coupled to the head assembly, the drive mechanism configured to rotate about a fixed axis on the head assembly;
   a lopping mechanism coupled to the head assembly;
   an actuating line coupling the lopping mechanism to the drive mechanism;
   a transfer line coupling the drive mechanism to a slide block;
   a stationary block having at least one stationary block pulley rigidly coupled to the elongated member below the head assembly; and
   a tension line having a first end coupled to the slide block, the tension line configured to movably engage the stationary block and the slide block.

2. The low profile pruning tool of claim 1, wherein the drive mechanism includes a double pulley having a first pulley and a second pulley.

3. The low profile pruning tool of claim 2, wherein the lopping mechanism includes a blade cooperable with a hook portion, the hook portion being integral with the head assembly.

4. The low profile pruning tool of claim 3, wherein the blade is configured to pivot towards the head.

5. The low profile pruning tool of claim 4, wherein the blade and the hook portion are configured as a pair of downwardly extending jaws.

6. The low profile pruning tool of claim 5, further comprising a spring configured to bias the blade to an open position.

7. The low profile pruning tool of claim 6, wherein the slide block includes one or more slide block pulleys to rotatably guide the tension line through the slide block.

8. The low profile pruning tool of claim 7, wherein the stationary block pulley rotatably guides the tension line.

9. The low profile pruning tool of claim 2, wherein the first pulley is configured to rotate eccentrically relative to the second pulley.

10. The low profile pruning tool of claim 1, further comprising a saw blade coupled to the head assembly.

11. The low profile pruning tool of claim 1, wherein the one or more elongated members are coaxially and telescopingly extendable.

12. The low profile pruning tool of claim 1, wherein the tension line, the transfer line and the actuating line are selected from the group consisting of chain, cable, strap, cord, wire and rope.

13. The low profile pruning tool of claim 1, wherein the tension line includes a second end connected to a lower region of the elongated member.

14. A kit for a low profile pruning tool comprising:
   one or more elongated members;
   a head assembly including a lopping mechanism and a pulley, the head assembly configured to attach to an upper region of the elongated member;
   a drive mechanism adapted for rotation about a fixed axis on the head assembly;
   an actuating line configured to couple the lopping mechanism to the pulley;
   a transfer line configured to couple the pulley to a slide block;
   a stationary block having at least one stationary block pulley configured to attach to the elongated member below the head assembly; and
   a tension line having a first end configured to attach to the slide block, the tension line further configured to movably engage the stationary block and the slide block.

15. A low profile pruning tool comprising:
   one or more elongated members having a first end coupled to a head, the head including a lopping mechanism;
   a drive mechanism coupled to the head, the drive mechanism including a first rotational member connected to a second rotational member;
   a first coupler coupling the lopping mechanism to the drive mechanism;
   a second coupler coupling the drive mechanism to a slide block;
   a stationary block having at least one stationary block pulley attached to the elongated member; and
   a tension line coupled to the slide block and the stationary block.

16. The low profile pruning tool of claim 15, wherein the slide block includes one or more pulleys to rotatably guide the tension line.

17. The low profile pruning tool of claim 15, wherein the first rotational member is eccentric relative to the second rotational member for creating a variable cutting force on the lopping mechanism.

18. The low profile pruning tool of claim 15, wherein the second rotational member is larger than the first rotational member.

19. The low profile pruning tool of claim 15, wherein the first rotational member and second rotational member are a circular pulley.

20. A low profile pruning tool comprising:

cutting means for lopping vegetation;

actuating means for actuating the cutting means, the actuating means comprising a stationary block having at least one stationary block pulley;

first means for providing a rotational mechanical advantage to the actuating means; and second means for providing a translational mechanical advantage to the actuating means.

21. A low profile pruning tool comprising:

at least one elongated member;

a head coupled to the elongated member;

a lopping mechanism coupled to the head;

a coupler coupling the lopping mechanism to a slide block, wherein the coupler includes a drive mechanism having one or more rotational members;

a stationary block having at least one stationary block pulley attached to the elongated member; and a tension line coupled to the slide block and the stationary block.

22. The low profile pruning tool of claim 21, wherein the lopping mechanism includes a pivotally attached blade cooperable with a stationary hook portion.

23. The low profile pruning tool of claim 21, wherein the slide block includes one or more rotational members.

24. The low profile pruning tool of claim 21, wherein the slide block and the tension line are configured to provide a mechanical advantage.

* * * * *